United States Patent [19]

Tronzano et al.

[11] 4,222,083
[45] Sep. 9, 1980

[54] WRITING AND/OR READING APPARATUS FOR MAGNETIC TAPE CASSETTES

[75] Inventors: Sergio Tronzano, Caluso; Mirco Raccanelli, Ivrea; Carlo Romano, Montalto Dora, all of Italy

[73] Assignee: Ing. C. Olivetti & C., S.p.A., Ivrea, Italy

[21] Appl. No.: 897,336

[22] Filed: Apr. 18, 1978

[30] Foreign Application Priority Data

Apr. 20, 1977 [IT] Italy ............................ 67872 A/77

[51] Int. Cl.$^2$ .......................................... G11B 15/68
[52] U.S. Cl. .................................................. 360/92
[58] Field of Search ................... 360/92, 91; 242/201

[56] References Cited

U.S. PATENT DOCUMENTS

| Re. 29,733 | 8/1978 | Darwood | 360/92 |
|---|---|---|---|
| 3,317,212 | 5/1967 | Tatter | 360/92 |
| 3,560,666 | 2/1971 | Bookman | 360/92 |
| 3,620,476 | 11/1971 | Cervantes | 360/92 |
| 4,029,269 | 6/1977 | Clarridge | 242/201 |
| 4,114,834 | 9/1978 | Haake | 242/201 |

Primary Examiner—John H. Wolff
Attorney, Agent, or Firm—Schuyler, Birch, McKie & Beckett

[57] ABSTRACT

The apparatus is adapted to simultaneously treating a pair of magnetic tape cassettes. The apparatus comprises two pairs of hubs, which cooperate with the reels of the magnetic tapes, and which can rotate in both directions at a substantially constant angular speed under the control of a single electric motor. A pair of magnetic heads are employed for writing and/or reading binary information on the two tapes. The data read by the heads are regarded as information only if they exceed a predetermined threshold value defined by a voltage generator. A control circuit, comprising a variable gain amplifier, maintains the ratio between the peak of the data detected and the value of the threshold substantially constant, taking into account the variations of the linear speed of the tapes.

4 Claims, 8 Drawing Figures

WRITING AND/OR READING APPARATUS FOR MAGNETIC TAPE CASSETTES

BACKGROUND OF THE INVENTION

The present invention relates to an apparatus for writing and/or reading binary information on magnetic tapes, each contained in a cassette and wound on reels, comprising a pair of seats, each of which is adapted to accommodate a corresponding tape cassette and has a pair of hubs for driving the corresponding tape.

SUMMARY OF THE INVENTION

A first object of the present invention is to produce an apparatus of the type described which is reliable and at the same time not costly.

According to the present invention in one aspect, there is provided apparatus for writing and/or reading binary information on magnetic tapes each contained in a cassette, comprising two seats, each of which is adapted to accommodate a corresponding tape, a single electric motor and a mechanism operable to couple each of the hubs selectively to the electric motor for effecting the drive of the tape of a selected one of the two cassettes.

A second object of the present invention is to produce an apparatus for writing and/or reading magnetic tapes wherein the drive of the tape takes place only by rotation of the tape take-up reel at substantially constant angular velocity and wherein the data read is regarded as information only if it exceeds a predetermined threshold value.

According to the invention in another aspect, there is provided apparatus for writing and/or reading binary information on magnetic tapes each contained in a cassette, comprising two seats, each of which is adapted to accommodate a corresponding tape cassette and has a magnetic writing and/or reading head, a circuit for generating and/or detecting pulses and a selector circuit connecting each of the two heads selectively to the pulse/generating and/or detecting circuit.

Further according to the invention, there is provided apparatus for reading binary information on a magnetic tape wound on reels, wherein the drive of the tape takes place by rotation of a reel at substantially constant angular velocity and wherein the data read is regarded as information only if it exceeds a predetermined threshold value, comprising a circuit for detecting the data read and a control circuit maintaining the ratio between the peak of the data detected and the value of the said threshold substantially constant.

BRIEF DESCRIPTION OF THE DRAWING

The invention will be described in more detail, by way of example, with reference to the accompanying drawings in which.

DESCRIPTION OF PREFERRED EMBODIMENT OF THE INVENTION

General Description

Figure 1:
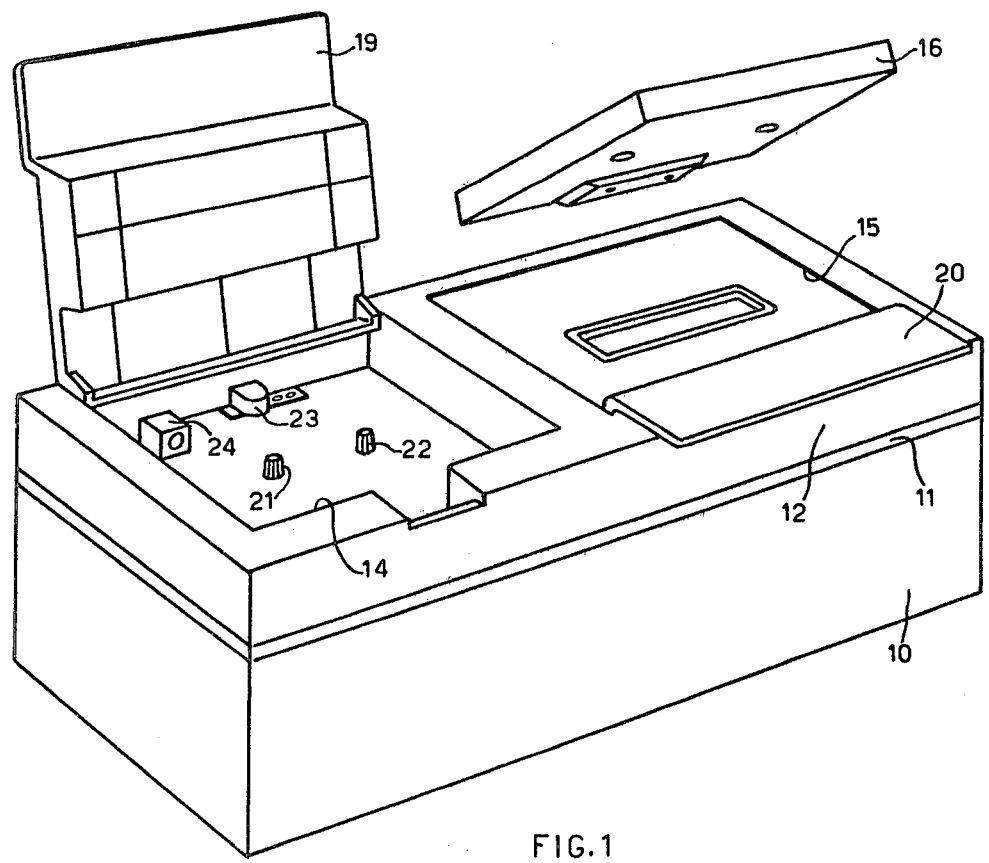
FIG. 1 is a perspective view of an apparatus embodying the invention.

The apparatus embodying the invention (FIGS. 1 and 2) includes a base 10 having a plate 11 on top of which there is arranged a container 12 of plastics material shaped so as to define two substantially rectangular recesses inside each of which a cassette 16 of known type containing a magnetic tape 17 wound on reels is adapted to be arranged. Two covers 19 and 20 are arranged and pivoted on the rear side of the container 12.

Inside each of the recesses 14 and 15 are arranged two vertical hubs 21 and 22 adapted to engage with the reels of the tape 17, a magnetic write and/or read head 23, and a photosensor unit 24.

Below the plate 11 there are arranged an electric motor 28 (FIGS. 2 and 3) adapted to rotate the hubs 21 and 22 selectively and an electronic circuit, which will be described in detail hereinafter, for supplying the motor 28 and for writing and/or reading binary information on the tape 17 of each cassette 16.

Two microswitches 98 and 99 also disposed below the plate 11 can be actuated by levers 100 and 89, respectively, which detect by means of projections 87 and 86, respectively, thereof the presence of a cassette 16 in the recesses 14 and 15, respectively.

Tape Drive

The electric motor 28 is supported by three columns 30, 31 and 32 on the underside of the plate 11 and has a rubber ring 34 fixed on its shaft 35. By means of a transmission belt 36, which is guided by rollers 37 along a predetermined path, the motor 28 is adapted to rotate selectively any one of two pairs of pulleys 38 and 39, 40 and 41, each of which is keyed to a corresponding one of the hubs 21 and 22. Each of the pulleys 38 to 41 has a peripheral ring 42 of material with a high coefficient of friction and is normally held stationary by a corresponding pad of two pairs of pads 44, 45 made of rubber.

Figure 2:
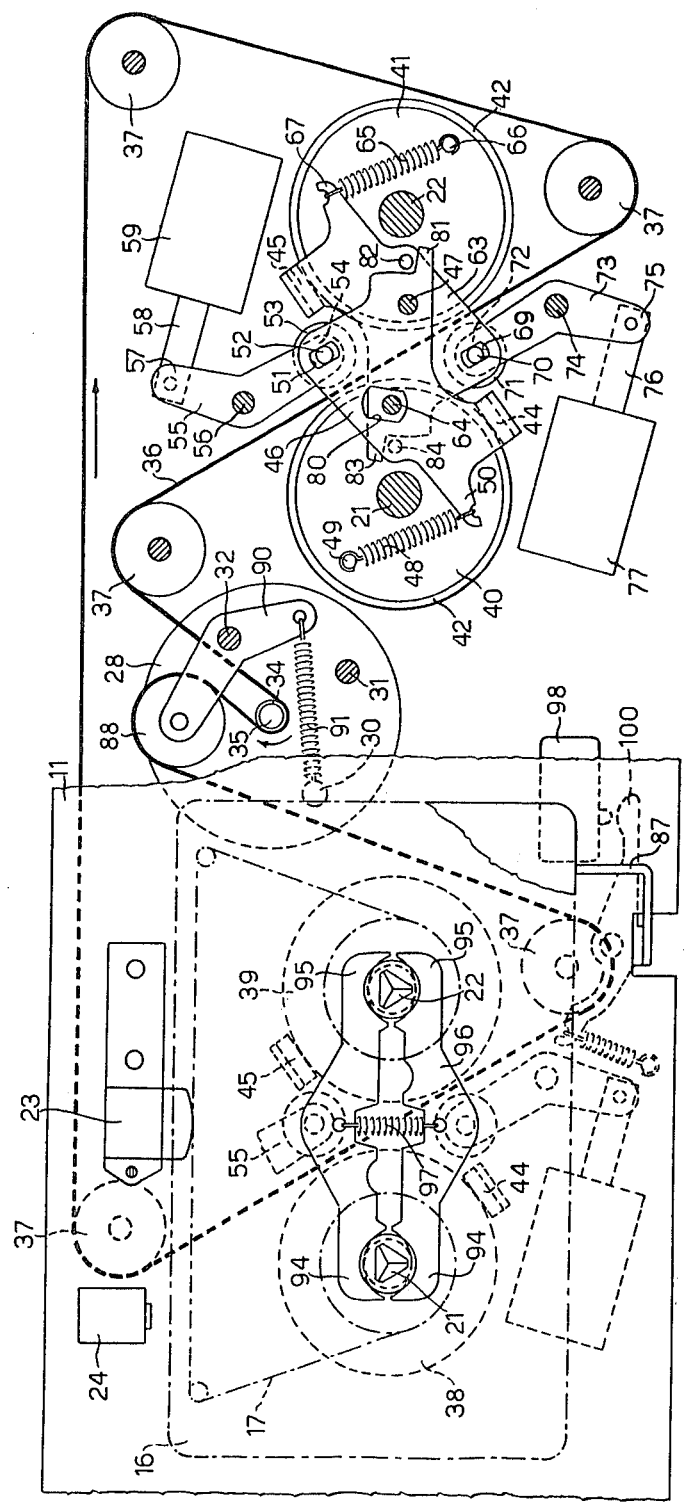
FIG. 2 is a plan view, partly in section, of the apparatus of FIG. 1.
Figure 3:
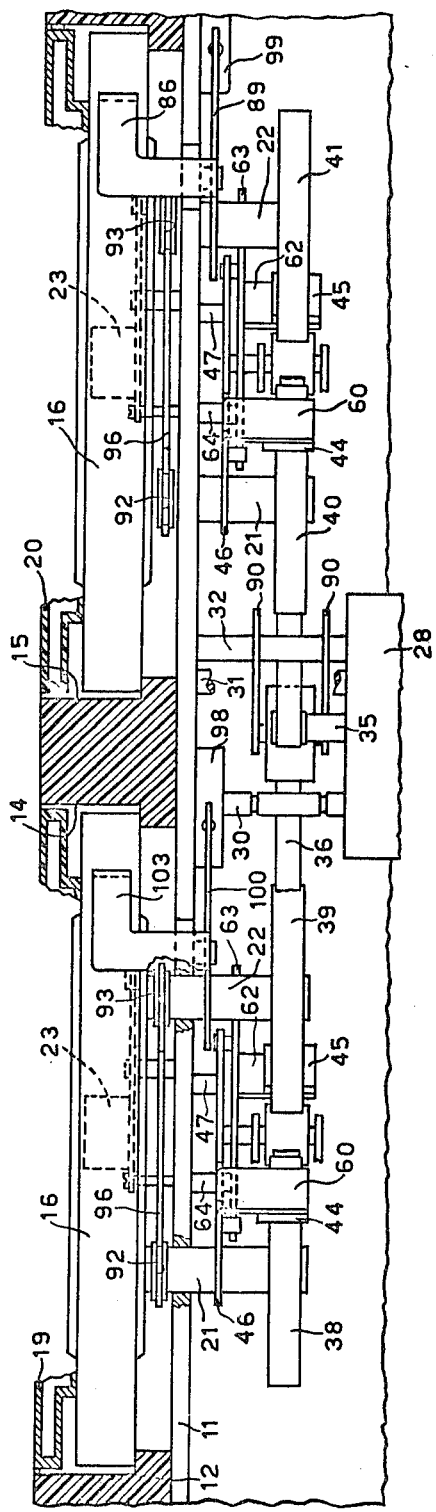
FIG. 3 is a front view, partly in section, of the apparatus of FIG. 1.

Transmission belt 36 passes between each pair of pulleys along a path having portions substantially tangent to each pulley at a slight distance therefrom (See FIG. 2.) This is the idling or non-driving position of belt 36.

Each pad 44 is fixed to a vertical bent portion 60 of a horizontal lever 46 pivoted on a pin 47 on the bottom of the plate 11 and is normally held against the pulley 38, 40 by a spring 48 stretched between a stud 49 on the plate 11 and one end 50 of the lever 46. The lever 46 has a slot 51 in which is seated the upper end of a pivot 52 of a rubber roller 53. The roller 53 is mounted rotatably at the end 54 of a lever 55 pivoted on a pin 56 of the plate 11 and having its other end 57 connected to the armature 58 of an electromagnet 59 supported by the plate 11.

Each pad is fixed to a vertical bent portion of a horizontal lever 63 disposed below the lever 46 and pivoted on a pin 64 on the plate 11. A spring 65 stretched between a stud 66 on the plate 11 and one end 67 of the lever 63 normally holds the pad 45 against the pulley 39, 41. The lever 63 has a slot 69 in which is seated the upper end of a pivot 70 of a rubber roller 71. This roller 71 is mounted rotatably at the end 72 of a lever 73 pivoted on a pin 74 of the plate 11 and having its other end 75 connected to the armature 76 of an electromagnet 77 supported by the plate 11.

The lever 46 has a window 80 through which passes the pin 64 and has a lateral lug 81 disposed in front of a stud 82 mounted on the lever 63. The lever 63, in turn, is provided with a lug 83 disposed in front of a stud 84 mounted on the lever 46.

On the column 32 there is pivoted a pair of levers 90 at one end of which there is mounted rotatably a roller 88 which keeps the belt 36 under tension under the action of a spring 91.

Each of the hubs 21 and 22 is provided at the top with a circular groove 92, 93, respectively, in which are seated the ends 94 and 95, respectively, of a pair of jaws 96 interconnected by a tension spring 97.

The drive of the tape 17 contained in the corresponding cassette 16 is effected by supplying the electric motor 28 and thus setting the transmission belt 36 in rotation. In order to transmit the motion from the belt 36 to one of the four pulleys 38 to 41, the corresponding electromagnet 59 or 77 is actuated.

Let is be assumed that it is desired to set the hub 21 in the recess 15 in rotation. The electromagnet 59 is energised and attracts the armature 58; this causes the lever 55 to turn clockwise and, by means of the roller 53, brings the belt 36 against the pulley 40. At the same time, the upper part of the pivot 52 causes the upper lever 46 to turn anticlockwise in opposition to the action of the spring 48 and removes the pad 44 from the pulley 40, thus leaving it free to rotate. The lever 46, turning anticlockwise, brings its lug 81 against the stud 82 and also causes the lower lever 63 to turn anticlockwise, removing the pad 45 from the pulley 41, without, however moving the roller 71 far enough to press the belt against the pulley 41.

The driven pulley 40 and the idle pulley 41 remain constantly and lightly held or checked by the jaws 96, which in this way keep the tape 17 always tensioned during its transfer from one reel to the other.

Similarly, by actuating the electromagnet 77 transfer of the tape 17 towards the reel coupled to the hub 22 is effected. To rewind the tape 17 rapidly on one of its reels, the electric motor 28 is supplied with a higher voltage and the corresponding electromagnet 59 or 77 is actuated.

Selector Circuits

The writing of recording system is of the NRZ 2F symmetrical cell type, the heads 23 are of the double gap type and the corresponding selector circuit comprises two like channels which can be activated one at a time by means of a selection signal SEL.

Figure 4:
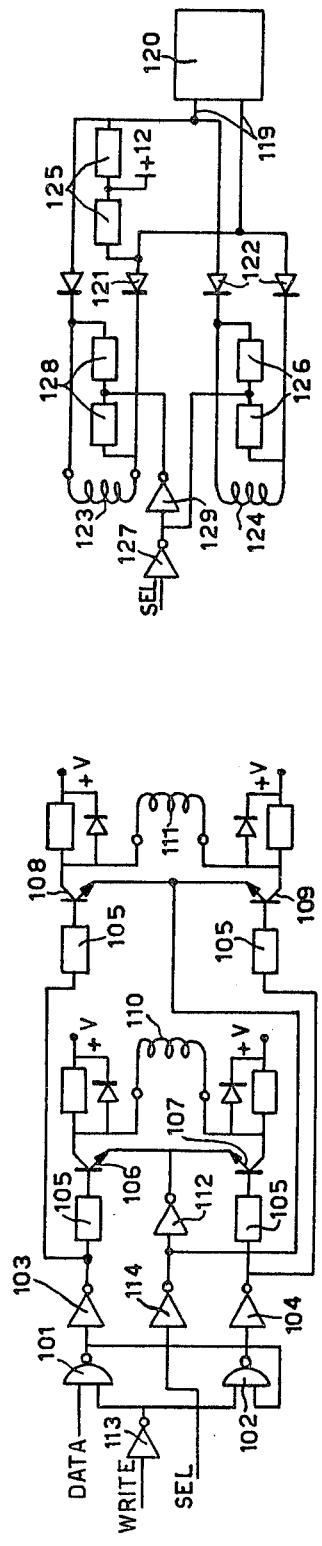
FIG. 4 shows a circuit of the apparatus of FIG. 1 for writing binary information.

Referring to FIG. 4, the writing selector circuit comprises two NAND elements 101 and 102 conditioned, via an inverter 113, by a signal WRITE and which drive, via a pair of inverters 103 and 104 and a resistor 105, the bases of four transistors 106, 107 and 108, 109 the collectors of which are connected in pairs to the writing windings, indicated by the reference 110 and 111, of the heads 23 in the recesses 14 and 15, respectively. A signal SEL can be sent via an inverter 114 to the emitters of the pair of transistors 108 and 109 and, after a further inversion in an inverter 112, to the emitters of the pair or transistors 106 and 107, while the data indicated by DATA enter the NAND element 101.

During writing, the signal WRITE is at "0" level and the NAND elements 101 and 102 allow the DATA pulses at "1" level to activate the bases of the transistors 106 and 107 and the pulses at "0" level to activate the bases of the transistors 108 and 109. By way of the inverters 114 and 112, the signal SEL at "0" level, in turn, permits the closing of the circuit of the winding 110 and, therefore, writing by the left-hand head 23, while the circuit 111 remains open. The signal SEL at "1" level, earthing the emitters of the pair of transistors 108 and 109, permits writing by the right-hand head 23, while writing with the left-hand head is inhibited.

Figure 5:
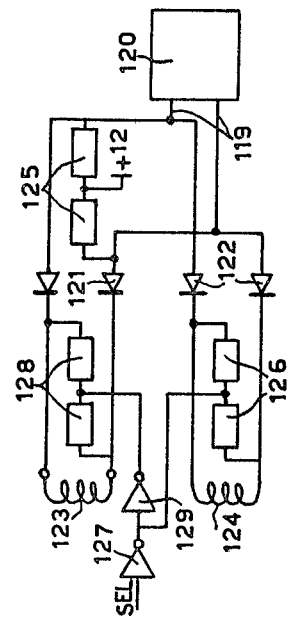
FIG. 5 shows a circuit of the apparatus of FIG. 1 for reading binary information.

Referring to FIG. 5, the reading selector circuit comprises a linear differential amplifier 120 at whose inputs 119 there arrive, via two pairs of diodes 121 and 122, the data coming from the readings windings, indicated by the reference 123 and 124, of the heads 23 in the recesses 14 and 15, respectively. The anodes of the diodes 121 are biased, by way of two resistors 125, by a voltage 12 volts higher than that of the logical "1" signal. The cathodes of the diodes 122 are connected via two resistors 126 to the output of an inverter 127 driven by the signal SEL, while the cathodes of the diodes 121 are connected, via another two resistors 128, to an inverter 128, driven in turn by the inverter 127.

The signal SEL at "0" level, the output of the inverter 129 at "0" level, acting via the resistors 125 and 128, allows the diodes 121 to be rendered conducting and the anodes of the diodes 121 and 122 to be brought to a low voltage. The diodes 122 will thus be inhibited, having the voltage at "1" level of the inverter 127 applied to their cathodes. Only the signals coming from the winding 123 of the left-hand head 23 through the conducting doides 121 can therefore arrive at the amplifier 120, while the data coming from the winding 124 of the right-hand head is blocked by the open diodes 122. Similarly, the signal SEL at "1" le el, rendering the diodes 122 conducting and inhibiting the diodes 121, permits reading by the right-hand head 23 only.

During writing and reading in the cassettes, the motor 28 is supplied at constant voltage in a manner known per se. The speed of translation of the tape 17 of each cassette is variable, according to the degree to which the pulling reel is filled, in the ratio of 1 to 2.5 from a minimum of 7.5 ips to a maximum of 18.7 ips. Each data block has a length of 140 characters and is preceded by a preamble of 40 bits. The transfer rate is 300 µs/bit and there is a maximum packing density of 400 bpi at the minimum speed of 7.5 ips.

Reading Circuits

The NRZ 2F writing system is autosynchronised and these variations in speed therefore do not prevent recognition of the signals in the reading stage. In order to minimise errors, however, only those signals which exceed a predetermined threshold value are allowed to be regarded as useful signals. On the other hand, the signals read have an amplitude proportional to the speed of the tape. Therefore, with a low threshold value, spurious signals or noise would be recognised as erroneous "1" bits during the advance of the tape at low speed. With too high a threshold value, on the other hand, useful change-overs would not be recognised and erroneous "0" bits would be obtained during the advance of the tape at low speed.

In view of this problem, the gain of the amplifier 120 (FIG. 5) is so varied as to obtain as output constant peaks independent of the amplitude of the change-over signals read on the reading windings 123 and 124 of the heads 23. To this end, the 40 bits of the preamble of each data block are used to bring the gain of the amplifier to the desired value, which then remains substantially constant during the reading of the block.

Figure 6:
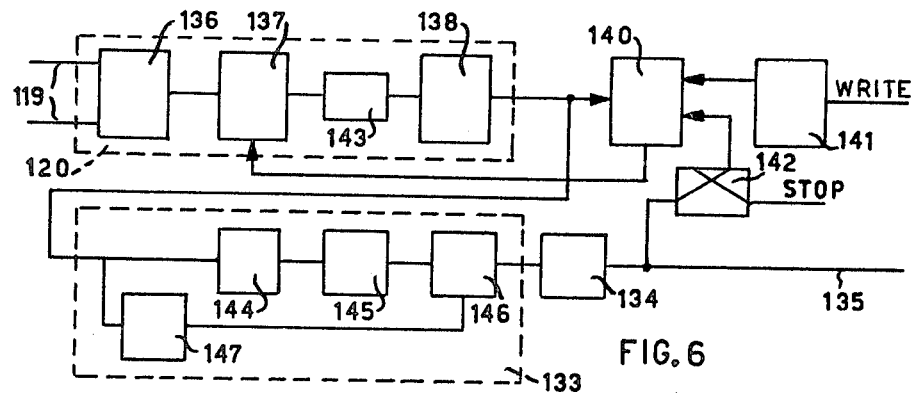
FIG. 6 shows a control circuit of the apparatus.

Referring to FIG. 6, the signals of the inputs 119, amplified in the amplifier 120, are shaped in a circuit 133 comprising, for example, a differentiator 144 and a zero crossing detector 145 which feed a shaper 146 controlled by a threshold detector 147 for the amplified signals, in a manner known to experts in this field. A discriminator 134 separates the information bits from the synchronizing bits and passes them to an output line 135.

The amplifier 120 comprises three stages 136, 137 and 138, the gain of which is fixed for the stages 136 and 138 and variable between two limit values for the stage 137. This variation is produced by a control circuit 140 as a function of a minimum value defined by a flip-flop 142, when the tape is not advancing, and by variable values depending on the speed of the tape. More particularly, a comparison is made between the peak value of the signal coming from the third stage 138 and a threshold value generated by a circuit 141, when the tape is in motion in the READ mode.

A filter 143 is moreover arranged between the stages 137 and 138 for limiting cross field disturbance by the recording gap on the windings 123 and 124 during reading in the writing stage.

Figure 7:
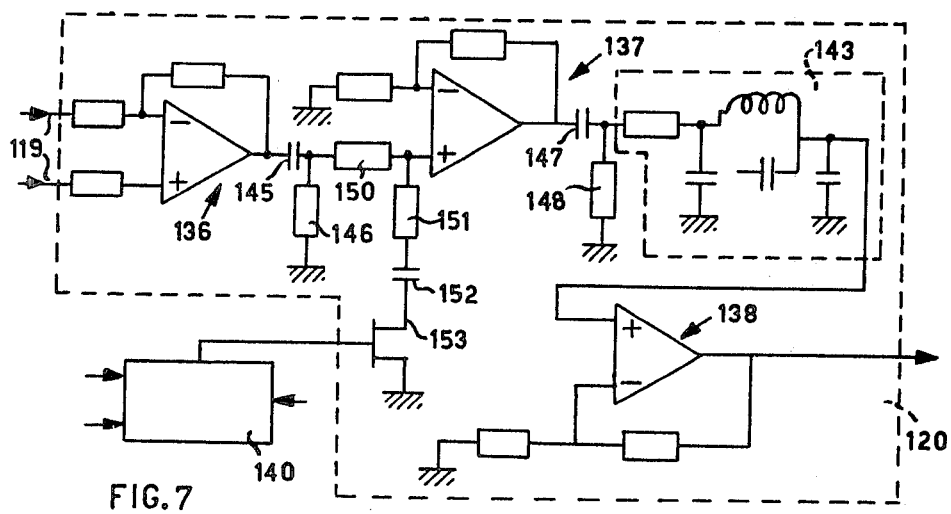
FIG. 7 shows a first detail of the control circuit of FIG. 6.

The stage 136 (FIG. 7) comprises a linear amplifier with a gain of about 5 which is coupled to the stage 137 via a capacitor 145 and a resistor 146 which eliminate the continuous component produced by the use of the diodes 121 and 122 and by the biasing voltage of the circuit of FIG. 5. The stages 137 and 138 are also linear and have respective gains of about 21 and 8 and are decoupled from one another by a capacitor 147 and a resistor 148.

The pulses of the capacitor 145 enter the input of the second stage 137 by way of a divider constituted by a series resistor 150 and a parallel resistor 151, and an FET 153. This FET is connected to the resistor 151 via a decoupling capacitor 152 and its resistance varies as a function of the signal coming from the circuit 140. When the FET is in a turned on state, the resistors 150 and 151, cause a reduction in the signal in a ratio of about 3.5, while there is no reduction when the FET is turned off, so that the total gain of the amplifier 120 varies from a minimum of about 250 to a maximum of 850 for a value of about 5 volts peak to peak.

Figure 8:
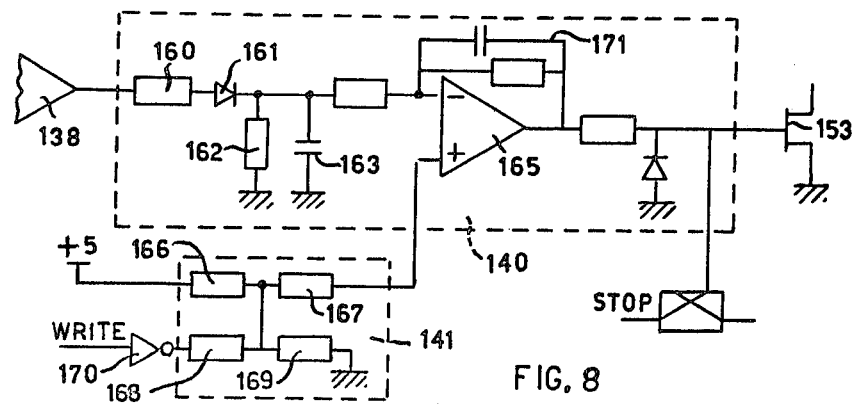
FIG. 8 shows a second detail of the control circuit of FIG. 6.

Referring to FIG. 8, the circuit 140 comprises a peak voltage detector constituted by a series resistor 160, a diode 161, a parallel resistor 162 and a capacitor 163 connected to the inverted input of a linear amplifier 165. The other input of the amplifier 165 is connected to the threshold generator 141 which, for example, is constituted by a network of resistors 166 to 169 supplied with the voltage of "1" level and, via an inverter 170, by the signal WRITE at "0" level. The signal of the amplifier 165 finally enters the gate of the FET 153.

In operation, the capacitor 163 is charged at the zero peak voltage level of the signal coming from the amplifier stage 138; this level is compared with the threshold voltage of the generator 141 and substantially equal to the zero-peak value of the amplified signal which it is desired to obtain. By comparison between the amplified signal and the threshold there is obtained at the output of the amplifier 165 a continuous voltage proportional to the amplitude of the signal read in the block which drives the gate of the FET 153 and therefore the amplitude of the signal at the input of the stage 138 (FIG. 6). At the end of the block, with the appearance of the signal STOP, the flip-flop 142 brings the amplification of the stage 137 to the minimum again.

More particularly, if the heads are positioned at the first block, the speed is the minimum and the signal supplied by the head is also the minimum. At the beginning of the block, the FET is turned on and the amplifier has a minimum gain inasmuch as a signal division is effected by the resistors 150 and 151 (FIG. 7) on a signal which is already low because of the minimum speed. Under these conditions, the signal at the output of the stage 138 would be 3 $V_{pp}$, whereas our aim is to obtain 5 $V_{pp}$. The capacitor 163 is charged at the zero-peak voltage level of the signal without the drop at the diode 161 which is about 0.5 V, that is about 1 V.

In this stage of reading, the signal WRITE is at "0" level and the reference voltage of the circuit 141 is 2 V. By comparison between these two levels a voltage is produced which, amplified by the gain of the amplifier 165, drives the FET 153, turning it off until the output voltage at the third stage 138 has reached the zero-peak 2.5 volts, at which point the output voltage of the amplifier 165 is stabilized and remains practically constant for the entire duration of the block.

This applies to all the blocks from the beginning to the end of the cassette, provided that the output signal at the third stage is considered higher, until the block is reached, at which the output signal at the head, amplified by the gain, reaches the value of 5 $V_{pp}$ and the intervention of the FET 153 is unnecessary.

A capacitor 171 between the inverted input and the output of the amplifier 165 has the function of imposing a time constant on the control voltage to the FET 153 such that the control voltage adjusts slowly and not instantaneously, a condition in which the system could become oscillatory. On the other hand, the resistor 162 has the function of supplying the amplifier 165 with the voltage corresponding to the zero-peak value of the signal with a time constant such that the FET 153 in its operating state may not receive sudden variations in level at its gate, a condition in which it could release itself from its working zones.

The amplifier is provided with a reading threshold and with a check commanded by the writing signal. More particularly, in reading during writing or recording, the threshold is raised to check the quality of the writing which is being carried out. The circuit 140 is used for this purpose by lowering the value of the reference voltage of the circuit 141 with the signal WRITE at "1" level. The gain will then be blocked when the zero peak level in the linear signal is equal to the new level of the reference voltage.

If, for example, the threshold value is fixed at 1.5 V, the maximum-output level of the amplifier will remain set at 4 $V_{pp}$, compared with 5 $V_{pp}$ obtained in reading.

What we claim is:

1. An apparatus for writing and/or reading binary information on magnetic tapes each one contained in a cassette of the type comprising a container and two coplanar spools on which the tape is wound said apparatus comprising:
   a plurality of lodging seats each adapted to receive a single tape cassette, each one of said seats having a pair of hubs protruding therefrom for engaging the two spools of the corresponding lodged cassette for bidirectionally feeding the tape contained therein;

a single electric motor having a continuously and unidirectionally rotating shaft;

a plurality of pairs of pulleys corresponding to said pairs of hubs, each hub having a pulley fixed thereto;

a single transmission belt coupled to said rotatable shaft;

guide means for guiding said transmission belt to pass between the pulleys of each pair of pulleys and along a path having portions substantially tangent to each one of said pulleys at a slight distance therefrom, and defining an idling position of said belt; and means selectively actuatable for coupling a tangent portion of said transmission belt to each one of said pulleys for effecting the rotation of said pulley and the hub and tape spool engaged therewith to feed the associated tape in one of the two possible directions, independently from the movement conditions of the other tape.

2. An apparatus according to claim 1, wherein said coupling means comprises a plurality of pressure rollers and a plurality of actuators therefor which bring a tangent portion of said belt selectively into contact with a selected corresponding pulley for rotation thereof.

3. An apparatus according to claim 2, wherein a pad normally contacts each pulley to keep it stationary, and wherein the actuation of each one of said rollers to effect rotation of a selected pulley causes the associated pad to move away from the selected pulley.

4. An apparatus according to claim 3, further comprising coupling means provided between the two pads associated with each pair of pulleys for moving one of said two pads away from its respective pulley in response to the movement of the other pad away from its respective pulley.

* * * * *